US009748619B2

(12) United States Patent
Iida

(10) Patent No.: US 9,748,619 B2
(45) Date of Patent: Aug. 29, 2017

(54) ONBOARD BATTERY FOR VEHICLE

(71) Applicant: SUBARU CORPORATON, Tokyo (JP)

(72) Inventor: Minoru Iida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/863,343

(22) Filed: Sep. 23, 2015

(65) Prior Publication Data

US 2016/0093933 A1 Mar. 31, 2016

(30) Foreign Application Priority Data

Sep. 29, 2014 (JP) .................................. 2014-198561

(51) Int. Cl.
H01M 10/656 (2014.01)
H01M 10/625 (2014.01)
H01M 10/6563 (2014.01)
H01M 2/10 (2006.01)
H01M 10/615 (2014.01)
H01M 10/6554 (2014.01)
H01M 10/613 (2014.01)
(Continued)

(52) U.S. Cl.
CPC ....... *H01M 10/625* (2015.04); *H01M 2/1077* (2013.01); *H01M 10/613* (2015.04); *H01M 10/615* (2015.04); *H01M 10/6554* (2015.04); *H01M 10/6563* (2015.04); *H01M 10/647* (2015.04); *H01M 10/658* (2015.04); *H01M 2220/20* (2013.01)

(58) Field of Classification Search
CPC .......... H01M 10/647; H01M 10/6554; H01M 10/6563; H01M 10/60; H01M 10/613; H01M 10/615; H01M 10/617; H01M 10/653; H01M 6/5038; H01M 10/658; H01M 2220/20; H01M 2/1077; H01M 10/625

See application file for complete search history.

(56) References Cited

FOREIGN PATENT DOCUMENTS

EP 2456003 A1 5/2012
JP 2010-108873 A 5/2010
(Continued)

OTHER PUBLICATIONS

Office Action dated Apr. 24, 2017, issued in corresponding German Patent Application No. 10 2015 218 226.6, with English language translation.

*Primary Examiner* — Basia Ridley
*Assistant Examiner* — Heng Chan
(74) *Attorney, Agent, or Firm* — McDermott Will & Emery LLP

(57) ABSTRACT

An onboard battery for a vehicle includes battery modules including battery cells disposed in a predetermined state, and a cell cover in which the battery cells are disposed. A part of an internal space of the cell cover is formed as chambers into which cooling air is sent. The onboard battery also includes a housing case that houses the battery modules, an intake duct that sends the cooling air into the battery modules, and an exhaust duct that discharges the cooling air sent into the battery modules. A heater that heats the battery cells is disposed in one of the chambers. A heat sink located opposite to the battery cells and attached to the heater is disposed in the one of the chambers.

10 Claims, 14 Drawing Sheets

(51) Int. Cl.
*H01M 10/647* (2014.01)
*H01M 10/658* (2014.01)

(56) References Cited

FOREIGN PATENT DOCUMENTS

| | | | |
|---|---|---|---|
| JP | 2010-140802 A | | 6/2010 |
| JP | 2011-076779 A | | 4/2011 |
| JP | 2013-025948 A | | 2/2013 |
| JP | 2013025948 A | * | 2/2013 |
| JP | 2013-519189 A | | 5/2013 |
| JP | 2013-161710 A | | 8/2013 |
| JP | 2013-218792 A | | 10/2013 |
| JP | 2014-089922 A | | 5/2014 |
| JP | 2014089922 A | * | 5/2014 |
| WO | 2011/094863 A1 | | 8/2011 |

* cited by examiner

ONBOARD BATTERY FOR VEHICLE

CROSS-REFERENCE TO RELATED APPLICATIONS

The present application claims priority from Japanese Patent Application No. 2014-198561 filed on Sep. 29, 2014, the entire contents of which are hereby incorporated by reference.

BACKGROUND

1. Technical Field

The present invention relates to the technical field of an onboard battery for a vehicle that is mounted to a vehicle such as an automobile and can be used in a cold area.

2. Related Art

In various vehicles such as an automobile, an onboard battery for a vehicle for supplying electric power to a motor and various electrical components is mounted.

In recent years, vehicles such as an electric vehicle (EV), hybrid electric vehicle (HEV), and plug-in hybrid electric vehicle (PHEV) are particularly becoming widespread. In these vehicles powered by electricity, an onboard battery having a high electricity storage function is mounted.

The onboard battery includes a plurality of battery modules. The battery module includes, for example, a plurality of battery cells (secondary batteries) such as a nickel-metal hydride battery or lithium-ion battery, a fixing member that tightens battery stacks in a stacked direction, and a bus bar module that electrically connects the battery cells.

The output performance of a battery cell used in such an onboard battery changes depending on the temperature, and the output performance of the battery cell decreases at low temperature. Thus, when the onboard battery is used in a cold area, necessary output may not be obtained by a motor or the like due to insufficient supply of power to the motor or the like from the onboard battery at low temperatures during winter or the like.

Thus, some onboard batteries to be used in a cold area are provided with a heater so that a battery cell is heated by the heater at low temperatures to enhance the output performance of the battery cell (see, for example, Japanese Unexamined Patent Application Publication (JP-A) Nos. 2013-218792 and 2010-140802).

In the onboard battery described in JP-A No. 2013-218792, a plurality of battery cells is disposed inside a case, a heat exchanging member is attached to each of both sides of the case, a temperature adjusting device is attached to each of ducts disposed respectively on both sides of the case, and a thermoelectric converter is disposed between the heat-exchanging member and the temperature adjusting device. At low temperatures, electricity is applied to each thermoelectric converter to heat a heating medium, and the battery cells disposed inside the case are heated by the heating medium.

In the onboard battery described in JP-A No. 2010-140802, a battery cell is held individually inside each cell cover, and multiple heater wires are disposed in an embedded state in each cell cover on the outer circumference side of each battery cell. At low temperatures, each heater wire is electrified to heat the battery cell held inside the cell cover.

SUMMARY OF THE INVENTION

In an onboard battery used in a cold area, there are cases where the output of a heater becomes insufficient depending on the surrounding environment or the like, and a sufficient output may not be obtained by a motor or the like due to insufficient supply of electric power to the motor or the like from the onboard battery. Particularly in the case where a vehicle has not been driven for a long period, put under an environment of extremely low temperature, or the like after driving of the vehicle has been finished, the recovery time until a stable output of a battery cell is ensured may increase.

If the number of heaters is increased or the output of a heater is increased in order to enhance the heating performance for a battery cell in an onboard battery, the structure becomes complicated and reduction of manufacturing cost becomes difficult.

Thus, it is desirable to ensure simplicity in structure, and improve the output performance of a battery cell at low temperatures without causing a rise in manufacturing cost.

An aspect of the present invention provides an onboard battery for a vehicle including at least one battery module including battery cells disposed in a predetermined state, and a cell cover in which the battery cells are disposed. Apart of an internal space of the cell cover is formed as at least one chamber into which cooling air is sent. The onboard battery also includes a housing case that houses the battery module, an intake duct that sends the cooling air into the battery module, at least one exhaust duct that discharges the cooling air sent into the at least one battery module, a heater that heats the battery cells and is disposed in the at least one chamber, and a heat sink that is disposed in the at least one chamber, located opposite to the battery cells, and attached to the heater.

The heat sink may be formed of a base body formed by a resin material, and a heat conductor provided to an outer surface of the base body and formed by a metal material. The base body may include a flat base plate section attached to the heater, and at least one protrusion protruding to the battery cell side from the base plate section. The heat conductor may be provided to a portion of the protrusion, other than an end surface of the protrusion.

The at least one protrusion may include multiple protrusions, and each of the multiple protrusions may be formed in a shape extending in a direction in which the battery cells are disposed.

The heat sink may have heat transferring holes opened to the heater side and the battery cell side, respectively.

The onboard battery may further have at least one cooling fan that causes the cooling air to flow be provided. Driving of the at least one cooling fan may be stopped when driving the heater.

The onboard battery may further have a heat insulating material that is attached to an outside of the at least one chamber in an outer surface of the at least one battery module.

The at least one battery module may comprise two battery modules. The two battery modules may be disposed to be adjacent to each other. The at least one chamber of one of the adjacent battery modules and the at least one chamber of the other battery module may communicate with each other. The heater may be disposed at a boundary of the at least one chamber of the one of the battery modules and the chamber of the other battery module. The heat sink may be disposed on each of two sides of the heater.

DETAILED DESCRIPTION

An onboard battery for a vehicle according to an implementation of the present invention will be described below with reference to the accompanying drawings.

Figure 1:
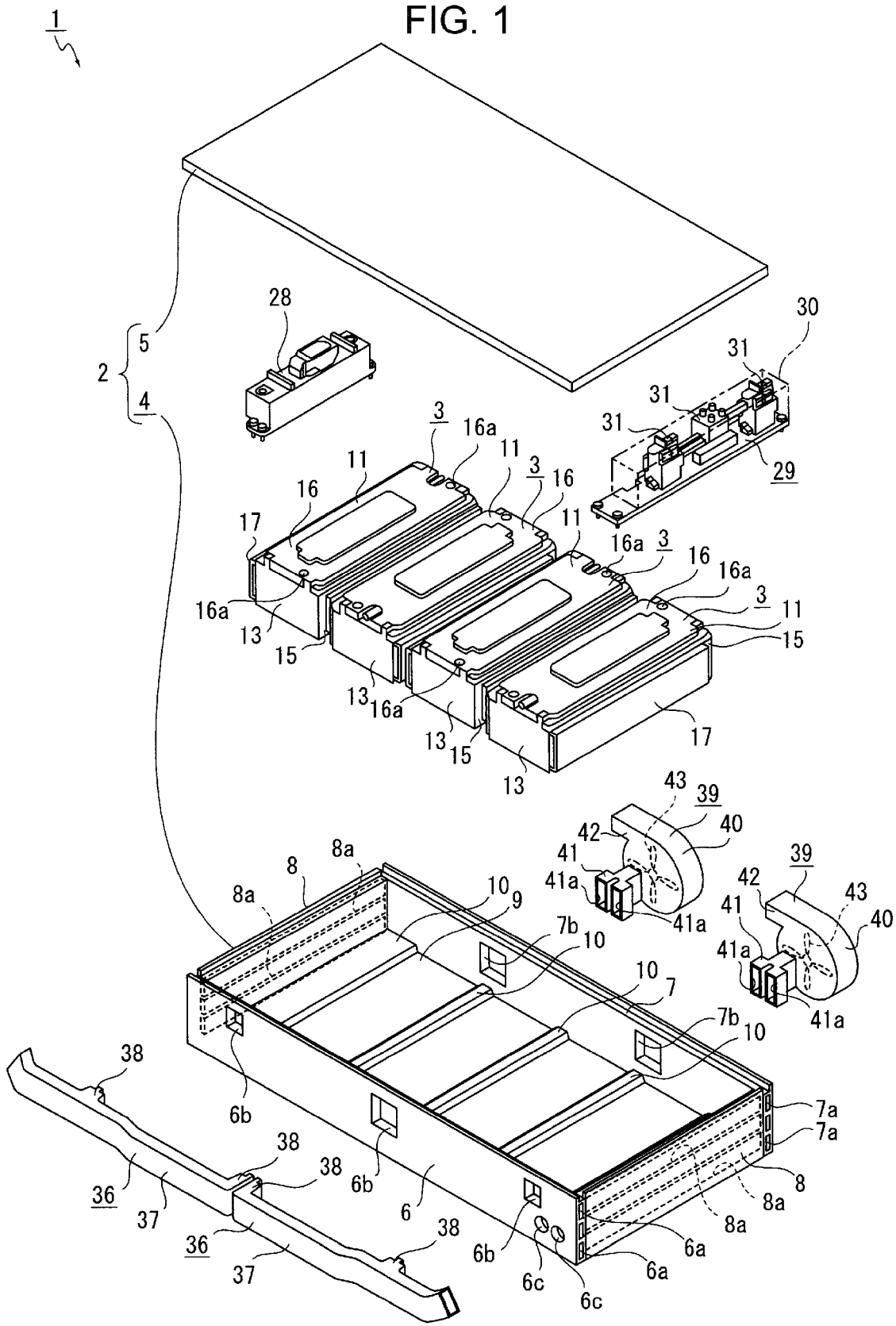
FIG. 1 is a schematic exploded perspective view of an onboard battery for a vehicle illustrating an onboard battery for a vehicle according to an implementation of the present invention together with FIGS. 2 to 14.
Figure 2:
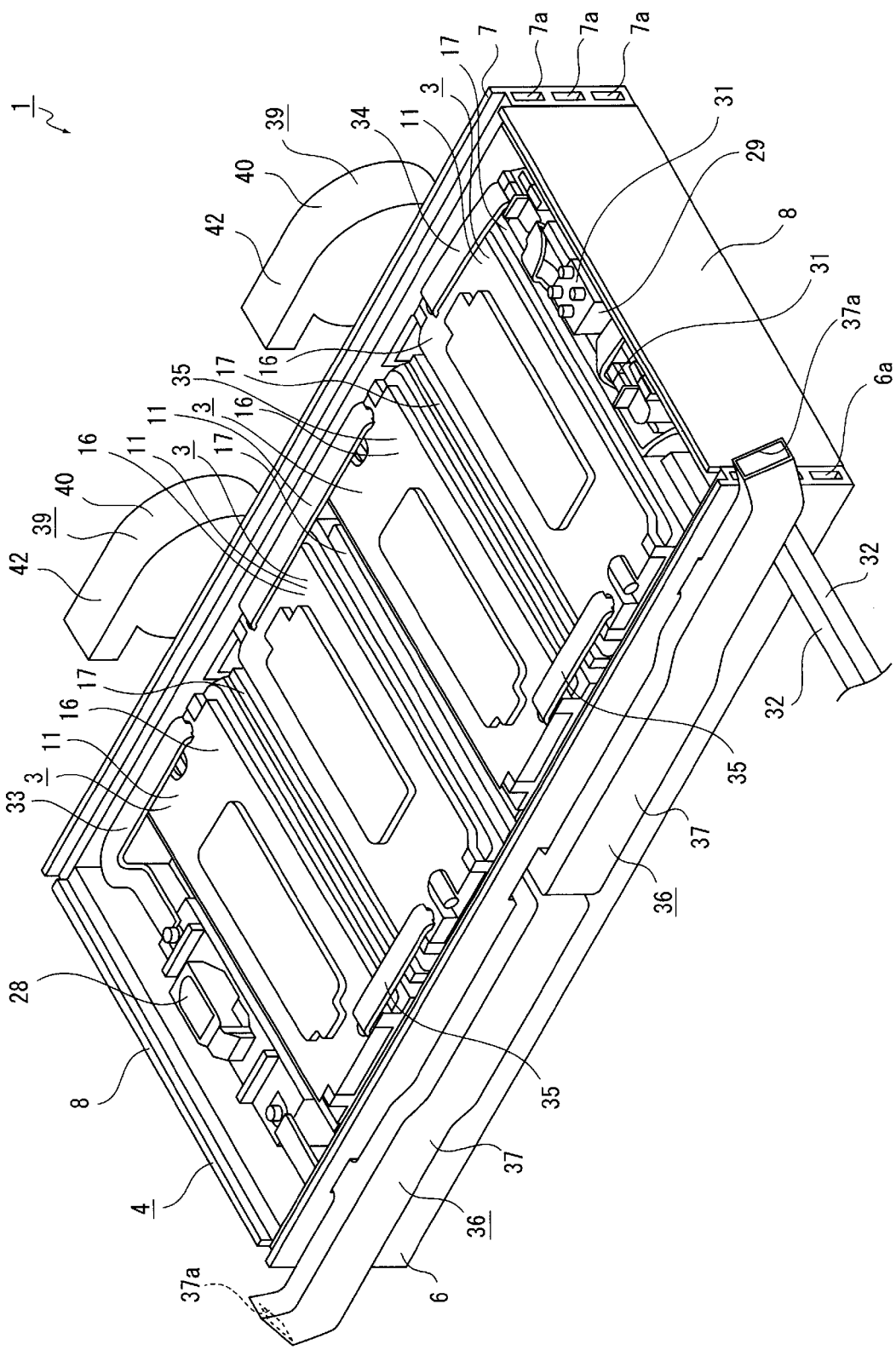
FIG. 2 is a perspective view of the onboard battery.

An onboard battery 1 includes a housing case 2 and battery modules 3 (see FIGS. 1 and 2). The onboard battery 1 is disposed above the floor of a vehicle body such as in a trunk behind a rear seat of the vehicle, for example.

The housing case 2 includes a housing 4 that is open upward and a plate-shaped lid 5 that closes the opening of the housing 4 from above.

The housing 4 includes a front wall 6 facing the front-back direction, a rear wall 7 located on the rear side of the front wall 6 and facing the front-back direction, side walls 8 located to be apart from each other in the left-right direction, and a bottom wall 9 facing the vertical direction. The front wall 6, the rear wall 7, the side walls 8, and the bottom wall 9 are all formed by extrusion molding of aluminum, for example, and has a hollow sectional surface.

The front wall 6 is formed with hollow sections 6a extending in the left-right direction and aligned vertically. The rear wall 7 is formed with hollow sections 7a extending in the left-right direction and aligned vertically. Each of the side walls 8 is formed with hollow sections 8a extending in the front-back direction and aligned vertically. The front wall 6 is formed with duct insertion holes 6b that are apart from each other in the left-right direction. One end of the front wall 6 in the left-right direction is formed with cable insertion holes 6c. The rear wall 7 is formed with duct insertion holes 7b that are apart from each other in the left-right direction.

Figure 3:
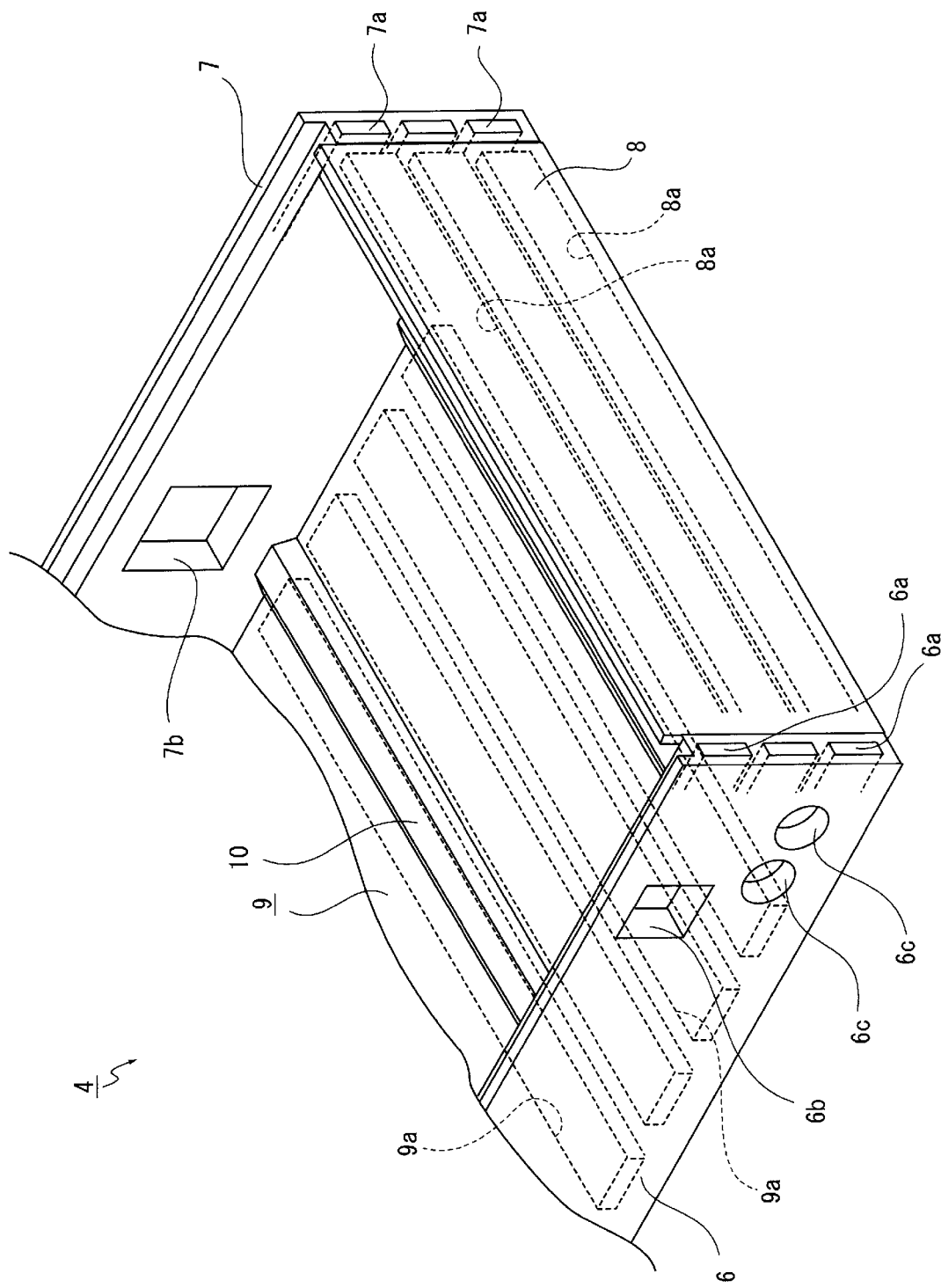
FIG. 3 is a perspective view illustrating a part of a housing case.

The bottom wall 9 is formed with hollow sections 9a extending in the front-back direction and aligned in the left-right direction (see FIG. 3).

The upper surface side of the bottom wall 9 is provided with partition protrusions 10 extending in the front-back direction to be apart from each other in the left-right direction. The partition protrusions 10 protrude upward.

Four battery modules 3 are aligned in the left-right direction and housed in the housing case 2, for example (see FIGS. 1 and 2).

The battery module 3 includes a cell cover 11 and a plurality of battery cells 12 disposed in the front-back direction inside the cell cover 11.

Figure 4:
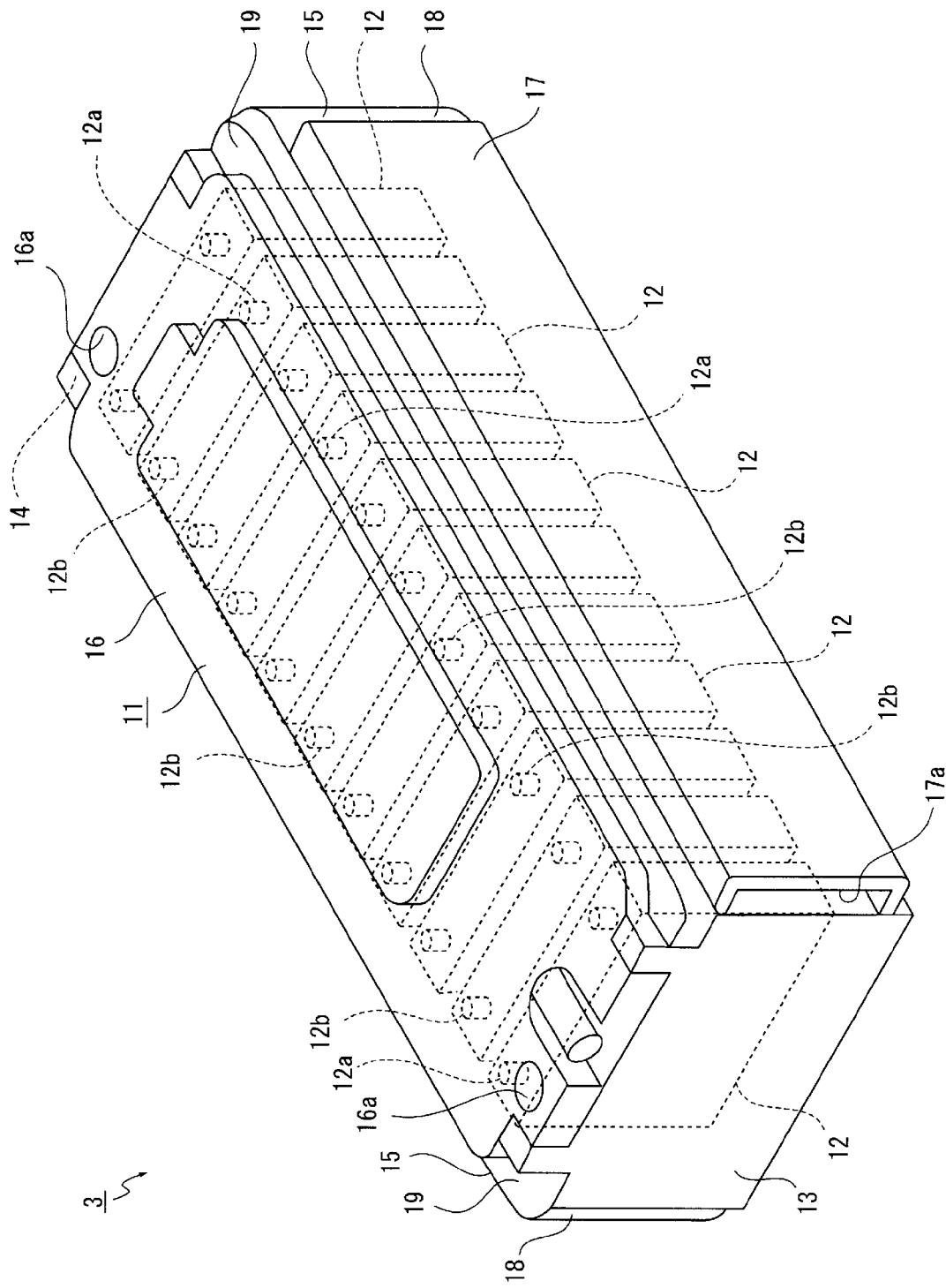
FIG. 4 is a perspective view of a battery module.
Figure 5:
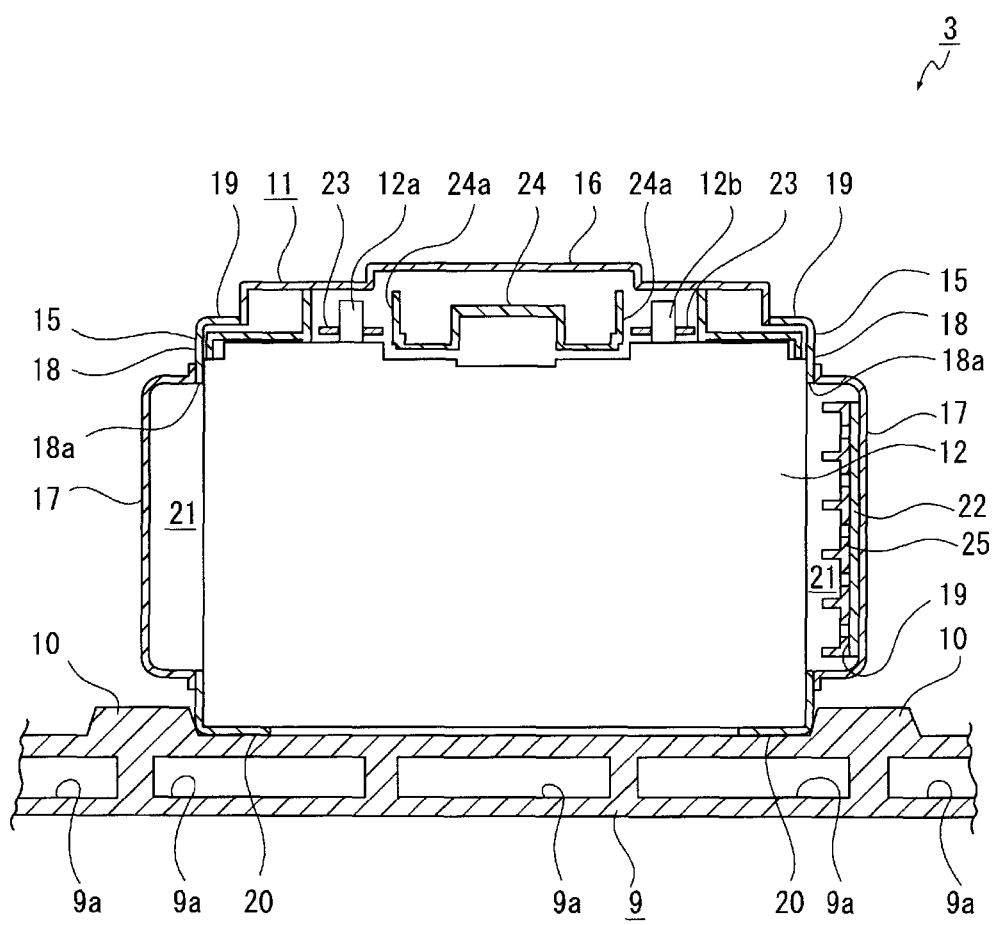
FIG. 5 is a sectional view illustrating a state where the battery module is disposed at a bottom wall.
Figure 6:
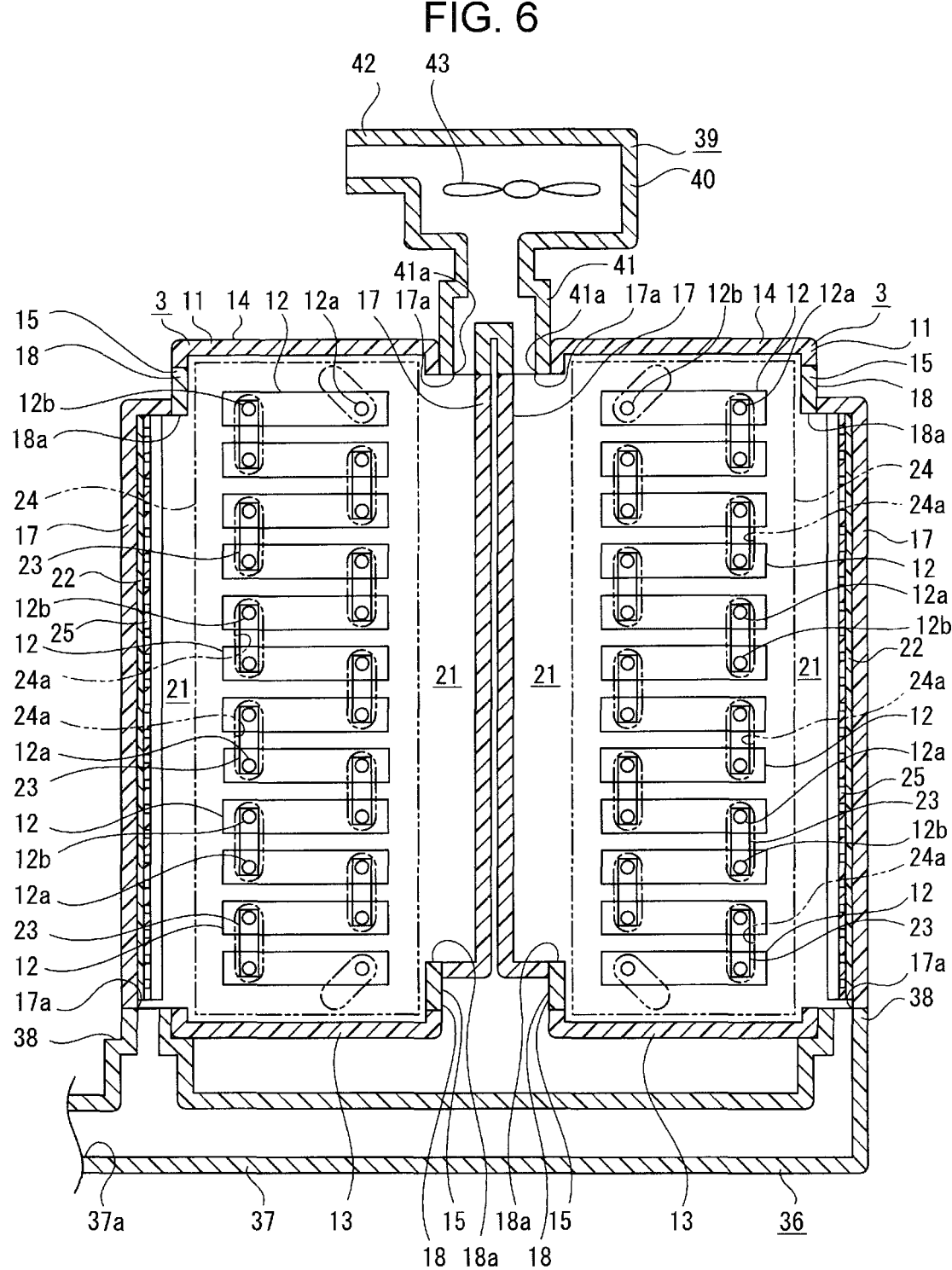
FIG. 6 is a conceptual diagram illustrating the battery module together with a duct in a state where a top surface section has been removed.

As illustrated in FIGS. 4 to 6, the cell cover 11 includes a front surface section 13 facing the front-back direction, a rear surface section 14 located on the rear side of the front surface section 13 and facing the front-back direction, side surface sections 15 located to be apart from each other in the left-right direction, a top surface section 16 facing the vertical direction, and chamber forming sections 17 respectively attached to the side surface sections 15.

The side surface sections 15 include attachment surface sections 18 facing the left-right direction, upper-side protruding surface sections 19 protruding in directions toward each other in the left-right direction from the upper edges of the attachment surface sections 18, and lower-side protruding surface sections 20 protruding in directions toward each other in the left-right direction from the lower edges of the attachment surface sections 18. The attachment surface section 18 is formed with an opening 18a penetrating in the left-right direction in a portion excluding the outer circumference.

The chamber forming section 17 is formed in a box shape that is open at the side and one of the front and back, and an opening edge in the left-right direction is attached to the outer circumference of the attachment surface section 18. By the chamber forming sections 17 being attached respectively to the outer circumferences of the attachment surface sections 18, spaces are formed respectively on both left and right sides inside the cell cover 11. These spaces are formed as chambers 21. The opening at one of the front and back of the chamber forming section 17 is formed as a coupling opening 17a.

At the top surface section 16, insertion holes 16a penetrating vertically are formed respectively at both front and back ends.

Figure 7:
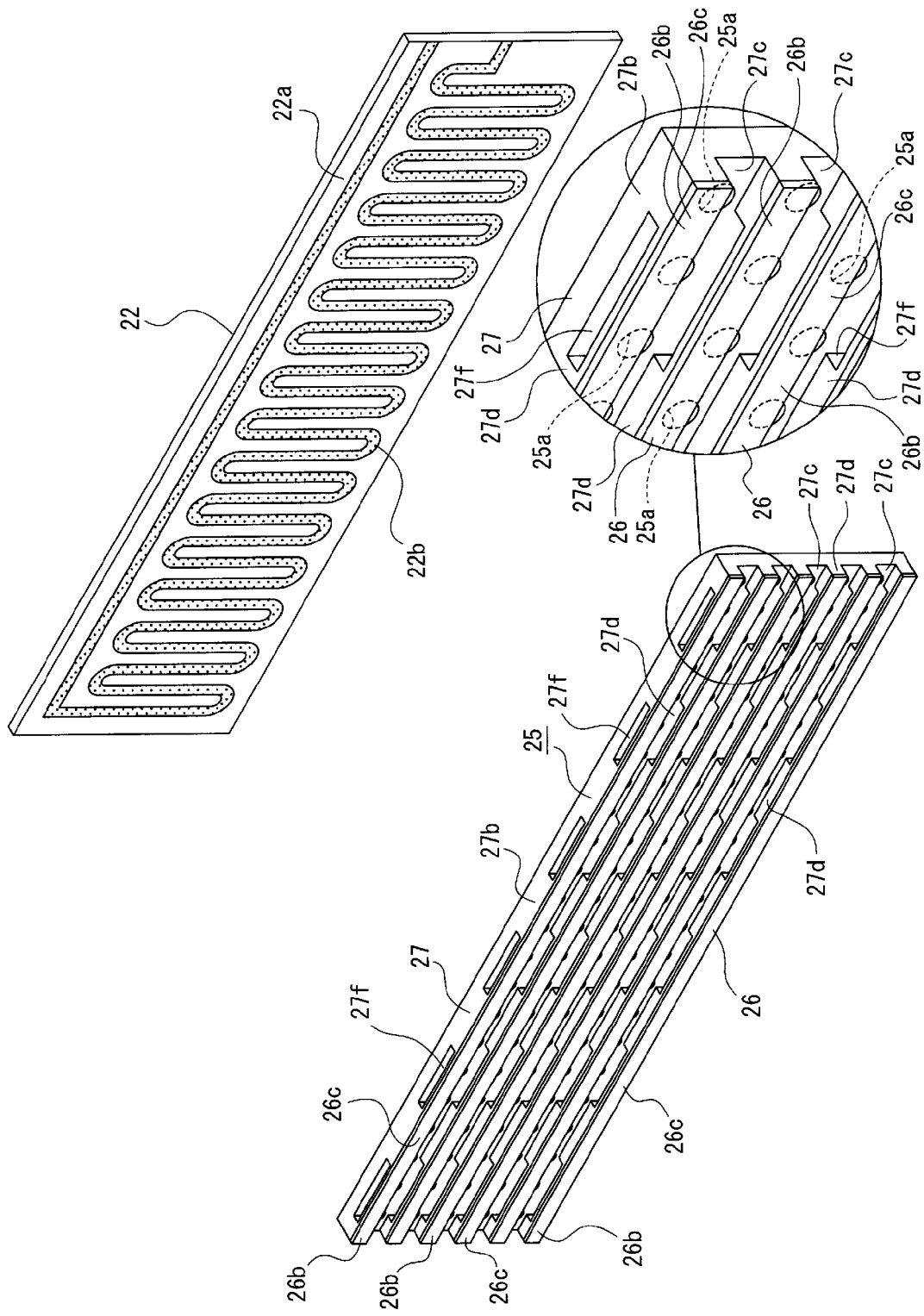
FIG. 7 is a perspective view illustrating a heater and a heat sink.

At the inner surface of one of the chamber forming section 17, a heater 22 is attached. The heater 22 is disposed in a chamber 21. As illustrated in FIG. 7, the heater 22 is formed in a plate shape facing the left-right direction such that the size in the front-back direction is larger than the size in the vertical direction. An electric heating wire 22b is provided and formed on a resin base 22a.

For the heater 22, it is possible to use a positive temperature coefficient (PTC) heater that detects the surrounding temperature to perform control of heat discharge, for example.

It is possible to dispose a heater electric wire, not illustrated, for supplying current to the heater 22 in the hollow sections 8a of the side walls 8 or the hollow sections 9a of the bottom wall 9, for example.

By disposing the heater electrical wire in the hollow section 8a or the hollow section 9a, the hollow section 8a or 9a is used as a disposition space for the heater electric wire, so that a disposition space for the heater electrical wire does not need to be formed separately inside the housing case 2, and size reduction of the onboard battery 1 can be achieved by effective utilization of the space.

Both left and right ends of the battery cells 12 are respectively placed on the lower-side protruding surface sections 20 of the side surface sections 15, held in the cell cover 11, and aligned and arranged at equal intervals in a state of having small gaps in the front-back direction (see FIG. 6). The battery cell 12 is provided with a positive electrode side terminal 12a and a negative electrode side terminal 12b that respectively protrude upward and are provided to be apart from each other in the left-right direction. In the battery cells 12, the positive electrode side terminals 12a and the negative electrode side terminals 12b located to be adjacent in the front-back direction are respectively connected in series by connecting plates 23 having conductivity.

At the upper surface of the battery cells 12, a pressing plate 24 is attached on the lower side of the top surface section 16 (see FIGS. 5 and 6). The pressing plate 24 is formed with disposition holes 24a extending in the front-back direction to be apart from each other in the front-back and left-right directions. At the disposition hole 24a, the positive electrode side terminal 12a and the negative electrode side terminal 12b of the battery cells 12 located to be adjacent in the front-back direction and the connecting plate 23 connecting the two are disposed.

Figure 8:
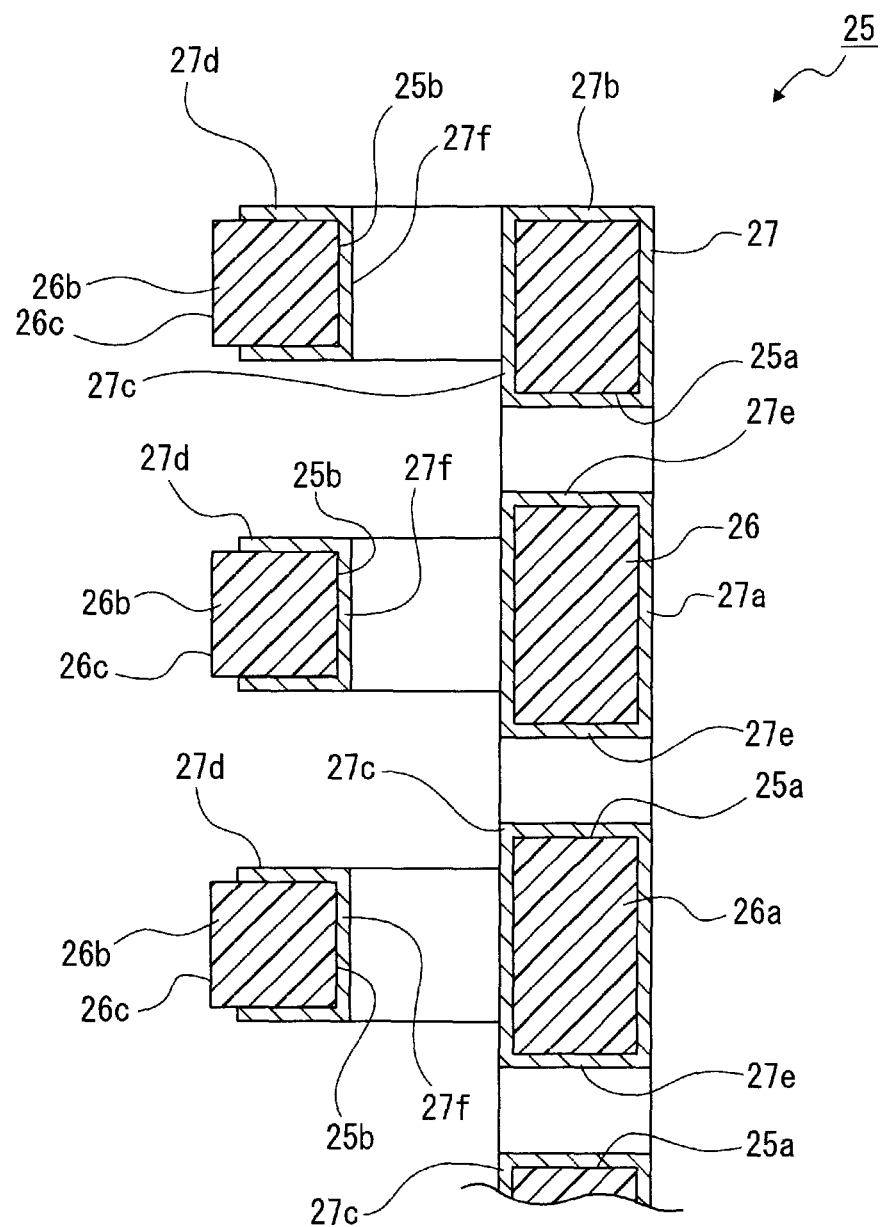
FIG. 8 is an enlarged sectional view of the heat sink.

At one side surface of the heater 22, a heat sink 25 is attached. The heat sink 25 is located opposite to the side surface of the battery cells 12 and is formed of, for example, a base body 26 formed by a resin material, and a heat conductor 27 formed by a metal material (see FIGS. 7 and 8).

The base body 26 includes a flat base plate section 26a facing the left-right direction and protrusions 26b protruding to the side from the base plate section 26a. The base plate section 26a is formed in approximately the same size and shape as the heater 22, and a surface on the opposite side of the protrusions 26b is attached to the side surface of the heater 22 by adhesion or the like. The protrusions 26b extend in the front-back direction and are located to be apart from each other at equal vertical intervals. The protrusions 26b are provided in positions across the front and rear ends of the base plate section 26a and are formed such that, for example, the perpendicular sectional shape is a rectangle.

The heat sink 25 is formed with heat transferring holes 25a penetrating in the left-right direction. The heat transferring holes 25a are formed in the base plate section 26a, for example, and located to be apart from each other at equal intervals in the left-right direction between the protrusions 26b. The heat transferring holes 25a are formed in a circular shape, for example.

The heat transferring holes 25a may be formed in a position across the base plate section 26a and the protrusion 26b.

The heat sink 25 is formed with effect holes 25b penetrating vertically. The effect holes 25b are formed, for example, in the protrusions 26b of the base plate section 26a to be apart from each other at equal intervals in the left-right direction. The effect holes 25b are formed in a rectangular shape, for example.

The heat conductor 27 is formed by performing a plating treatment with aluminum, for example, on the outer surface of the base body 26. The heat conductor 27 is provided in a portion of the outer surface of the base body 26 other than end surfaces 26c of the protrusions 26b.

The heat conductor 27 is formed of a contact section 27a provided to one side surface of the base plate section 26a, an outer circumference section 27b provided to the outer circumference surface of the base plate section 26a, opposing surface sections 27c provided to the other side surface of the base plate section 26a and located to be apart from each other vertically, circumferential sections 27d respectively provided to the circumferential surfaces of the protrusions 26b, first inner hole sections 27e respectively provided to the circumferential surfaces forming the heat transferring holes 25a, and second inner hole sections 27f respectively provided to the circumferential surfaces forming the effect holes 25b.

The heat sink 25 is attached to the heater 22 in a state where the surface of the contact section 27a is in contact with the side surface of the heater 22. In a state where the heat sink 25 is attached to the heater 22, the end surfaces 26c of the protrusions 26b in the base body 26 and the opposing surface sections 27c of the heat conductor 27 are is disposed to oppose the side surfaces of the battery cells 12.

Heat released from the heater 22 is transferred to the heat conductor 27 of the heat sink 25 and released from the heat conductor 27. The battery cells 12 are heated by heat released from the heat conductor 27.

At both left and right ends of the housing case 2, a plug sensor box 28 and a junction box 29 are respectively housed (see FIGS. 1 and 2). Inside the housing case 2, a battery control unit, not illustrated, that is in charge of the overall control of the onboard battery 1 is disposed.

In the plug sensor box 28, a predetermined connection plug, sensor, and the like are disposed.

The junction box 29 includes a casing 30 formed in an oblong shape and control components 31 that are disposed in the casing 30 to perform control of current and the like. As the control components 31, a relay, a fuse, and a connector terminal are provided, for example. The junction box 29 is connected with one ends of cables 32 inserted through the cable insertion holes 6c of the front wall 6. The junction box 29 is connected by the cables 32 to an electrical circuit (inverter), not illustrated, mounted beneath the floor of the vehicle.

The battery modules 3 are inserted between the plug sensor box 28 and the junction box 29 and housed in the housing case 2. The battery modules 3 are disposed in a state of being placed on the upper surface of the bottom wall 9 respectively in positions partitioned by the partition protrusions 10 provided to the bottom wall 9 of the housing case 2 (see FIG. 5).

In a state where the battery modules 3, the plug sensor box 28, and the junction box 29 are housed in the housing case 2 in a manner described above, the battery cell 12 of the battery module 3 located adjacent to the plug sensor box 28 and the plug sensor box 28 are connected by a first connection bus bar 33, and the battery cell 12 of the battery module 3 located adjacent to the junction box 29 and the junction box 29 are connected by a second connection bus bar 34. One end of the first connection bus bar 33 and one end of the second connection bus bar 34 are respectively inserted through the insertion holes 16a formed in the top surface sections 16 of the battery modules 3 to be connected with the positive electrode side terminal 12a and the negative electrode side terminal 12b of the battery cells 12.

The battery cells 12 of the adjacent battery modules 3 are respectively connected to each other by direct current bus bars 35. Both ends of the direct current bus bars 35 are respectively inserted through the insertion holes 16a formed in the top surface sections 16 of the battery modules 3 to be connected with the positive electrode side terminals 12a and the negative electrode side terminals 12b of the battery cells 12.

The plug sensor box 28 and the junction box 29 are connected to predetermined sections such as a battery control unit by an electrical wire or bus bar.

On the front surface side of the battery modules 3, intake ducts 36 are provided to be aligned in the left-right direction.

The intake duct 36 includes an intake section 37 extending in the left-right direction and coupling sections 38 protruding rearward from the intake section 37. The end surface on the outer side of the intake section 37 is formed with an intake opening 37a. The rear end surfaces of the coupling sections 38 are respectively formed with flow-in openings, not illustrated.

The intake sections 37 of the intake ducts 36 are located on the front side of the front wall 6 in the housing case 2, the coupling sections 38 are respectively inserted through the duct insertion holes 6b formed in the front wall 6, and the rear ends of the coupling sections 38 are respectively coupled with the front ends of the chamber forming sections 17 in the battery modules 3 (see FIG. 6). Thus, the flow-in openings of the coupling sections 38 and the coupling openings 17a of the chamber forming sections 17 communicate with each other, and cooling air taken in from the intake openings 37a is sent to the chambers 21 formed inside the battery modules 3 via the intake ducts 36.

The cooling air sent to the chambers 21 flows toward the chambers 21 on the opposite side from a gap between the battery cells 12. The plurality of protrusions 26b of the heat sink 25 disposed in the chamber 21 are formed in a shape extending in the front-back direction that is the direction in which the battery cells 12 are disposed. The direction is the same as the direction of sending the cooling air to the chamber 21 from the intake duct 36.

Since the extending direction of the protrusions 26b of the heat sink 25 is the same direction as the direction of sending cooling air to the chamber 21, the cooling air sent to the chamber 21 flows smoothly along the protrusions 26b, and the cooling air flows in sufficient amount to the sides of all of the battery cells 12 located to be aligned in the front-back direction. Thus, by the protrusions 26b being formed in a shape extending in the direction in which the battery cells 12 are disposed, the cooling efficiency with respect to the battery cells 12 can be improved, and cooling without unevenness with respect to the battery cells 12 can be performed.

On the rear surface side of the battery modules 3, exhaust ducts 39 are provided to be apart from each other in the left-right direction (see FIGS. 1 and 2). The exhaust duct 39 includes a fan disposition section 40 with an approximately circular external shape, a coupling protrusion 41 protruding forward from the fan disposition section 40, and an exhaust section 42 protruding sideward from the fan disposition section 40. The front end of the coupling protrusion 41 bifurcates in the left-right direction, and the front end surface is formed with flow-out openings 41a aligned in the left-right direction. The end surface of the exhaust section 42 is formed with an exhaust opening, not illustrated.

Inside the fan disposition section 40, a cooling fan 43 is disposed to be rotatable. The cooling fan 43 has a function of being rotated to cause cooling air to flow to the exhaust section 42 side from the coupling protrusion 41 side.

The fan disposition sections 40 and the exhaust sections 42 of the exhaust ducts 39 are located on the rear side of the rear wall 7 in the housing case 2, the coupling protrusions 41 are respectively inserted through the duct insertion holes 7b formed in the rear wall 7, and the front ends of the coupling protrusions 41 are respectively coupled with the rear ends of the chamber forming sections 17 in the battery modules 3 (see FIG. 6). Thus, the flow-out openings 41a of the coupling protrusions 41 and the coupling openings 17a of the chamber forming sections 17 communicate with each other, and cooling air that has cooled the battery cells 12 is discharged from the exhaust opening via the exhaust ducts 39 from the chambers 21.

The flow of cooling air in the intake ducts 36, the battery modules 3, and the exhaust ducts 39 described above is caused forcefully by the cooling fans 43, and the battery cells 12 are cooled efficiently.

In the onboard battery 1 configured in a manner described above, current is supplied to the electric heating wire 22b of the heater 22 via the heater electric wire at low temperatures. When current is supplied to the electric heating wire 22b, the electric heating wire 22b generates heat that is transferred to the heat sink 25 from the heater 22, air inside the battery module 3 is heated by heat released from the heat sink 25, and the battery cells 12 located to the side of the heater 22 are heated.

The temperature of the battery cells 12 heated by the heater 22 rises to improve the output performance and ensure a high electricity storage function.

Heat for the heat sink 25 from the heater 22 is transferred to the opposing surface sections 27c, the circumferential sections 27d, and the second inner hole sections 27f via the contact section 27a and the outer circumference section 27b from the electric heating wire 22b, or is transferred to the opposing surface sections 27c, the circumferential sections 27d, and the second inner hole sections 27f via the contact section 27a and the first inner hole sections 27e from the electric heating wire 22b. Heat transferred to the heat sink 25 from the heater 22 is mainly released with respect to the battery cells 12 from the opposing surface sections 27c, the circumferential sections 27d, and the second inner hole sections 27f, and the battery cells 12 are heated by heat released from the heat conductor 27.

In the onboard battery 1 described above, the heat transferring holes 25a are formed in the heat sink 25, and heat is transferred to the opposing surface sections 27c, the circumferential sections 27d, and the second inner hole sections 27f also via the first inner hole sections 27e provided to the heat transferring holes 25a.

Thus, by the heat transferring holes 25a being formed in the heat sink 25, the transfer path of heat generated in the heater 22 toward the battery cells 12 is shortened, heat loss upon transfer to the heat conductor 27 is reduced, and the heating efficiency with respect to the battery cells 12 can be improved.

By the heat transferring holes 25a being formed in the heat sink 25 and the first inner hole sections 27e being provided respectively to the heat transferring holes 25a, the heat release area in the heat sink 25 is increased, and the heating efficiency with respect to the battery cells 12 can further be improved.

Further, by the effect holes 25b being formed in the heat sink 25 and the second inner hole sections 27f being provided respectively to the effect holes 25b, the heat release area in the heat sink 25 is further increased, and the heating efficiency with respect to the battery cells 12 can further be improved.

When current is supplied to the electric heating wire 22b of the heater 22 in the onboard battery 1, the cooling fans 43 are controlled to be not rotated, so that the battery cells 12 are not cooled.

By the cooling fans 43 not being rotated when driving the heater 22 in this manner, the flow of air that is heated by the heater 22 to heat the battery cells 12 is suppressed inside the battery module 3. Therefore, the heating efficiency with respect to the battery cells 12 by the heater 22 can be improved.

In the onboard battery 1, as described above, the heater 22 that heats the battery cells 12 is disposed in the chamber 21, and the heat sink 25 located opposite to the battery cells 12 and attached to the heater 22 is disposed in the chamber 21.

Thus, by the heat sink 25 being disposed, the heat release area is increased, and the amount of heat released toward the battery cells 12 can be increased without increasing the number of the heaters 22 or increasing the output of the heater 22. Therefore, the output performance of the battery cell 12 at low temperatures can be improved with simplicity in structure ensured and without causing a rise in manufacturing cost.

Since the heater 22 and the heat sink 25 are both disposed in the chamber 21, simplicity in structure and size reduction of the onboard battery 1 can be achieved by effective utilization of the disposition space. Therefore, the output performance of the battery cells 12 at low temperatures can be improved without causing a rise in manufacturing cost.

Further, in the onboard battery 1, as described above, the heat sink 25 is formed of the base body 26 formed by a resin material and the heat conductor 27 provided to the outer surface of the base body 26 and formed by a metal material, and the heat conductor 27 is provided to the portion of the base body 26 other than the end surfaces 26c of the protrusions 26b.

Since the outer surfaces of the battery cells 12 are charged with an intermediate potential in the battery module 3, there is a possibility of a short circuit being caused, if crushing or falling of respective sections has occurred due to a collision or the like of the vehicle and a conductive portion contacts the battery cells 12.

Thus, by the heat conductor 27 being provided to the portion of the base body 26 other than the end surfaces 26c of the protrusions 26b in a manner described above, the end surfaces 26c of the protrusions 26b contact a non-conductive portion of the battery cells 12 when crushing or falling of respective sections has occurred due to a collision or the like of the vehicle. Therefore, occurrence of a short circuit can be prevented to avoid danger.

Figure 9:
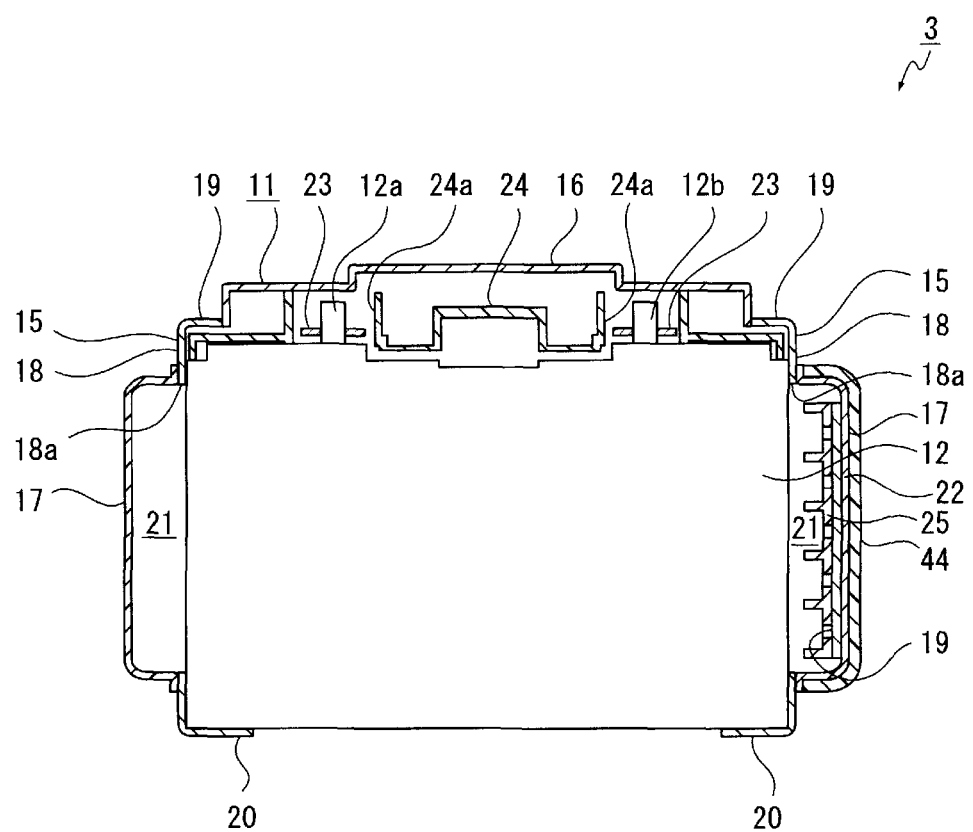
FIG. 9 is a sectional view illustrating an example in which a heat insulating material is attached to the outer surface of a chamber forming section.

A heat insulating material 44 may be attached to the outside of the chamber 21 in the outer surface of the battery module 3, e.g., the outer surface of the chamber forming section 17 (see FIG. 9).

By the heat insulating material 44 being attached to the outside of the chamber 21, release of heat from the heater 22 to the outside of the battery module 3 is suppressed, and the heating efficiency of the heater 22 with respect to the battery cells 12 can be improved.

Figure 10:
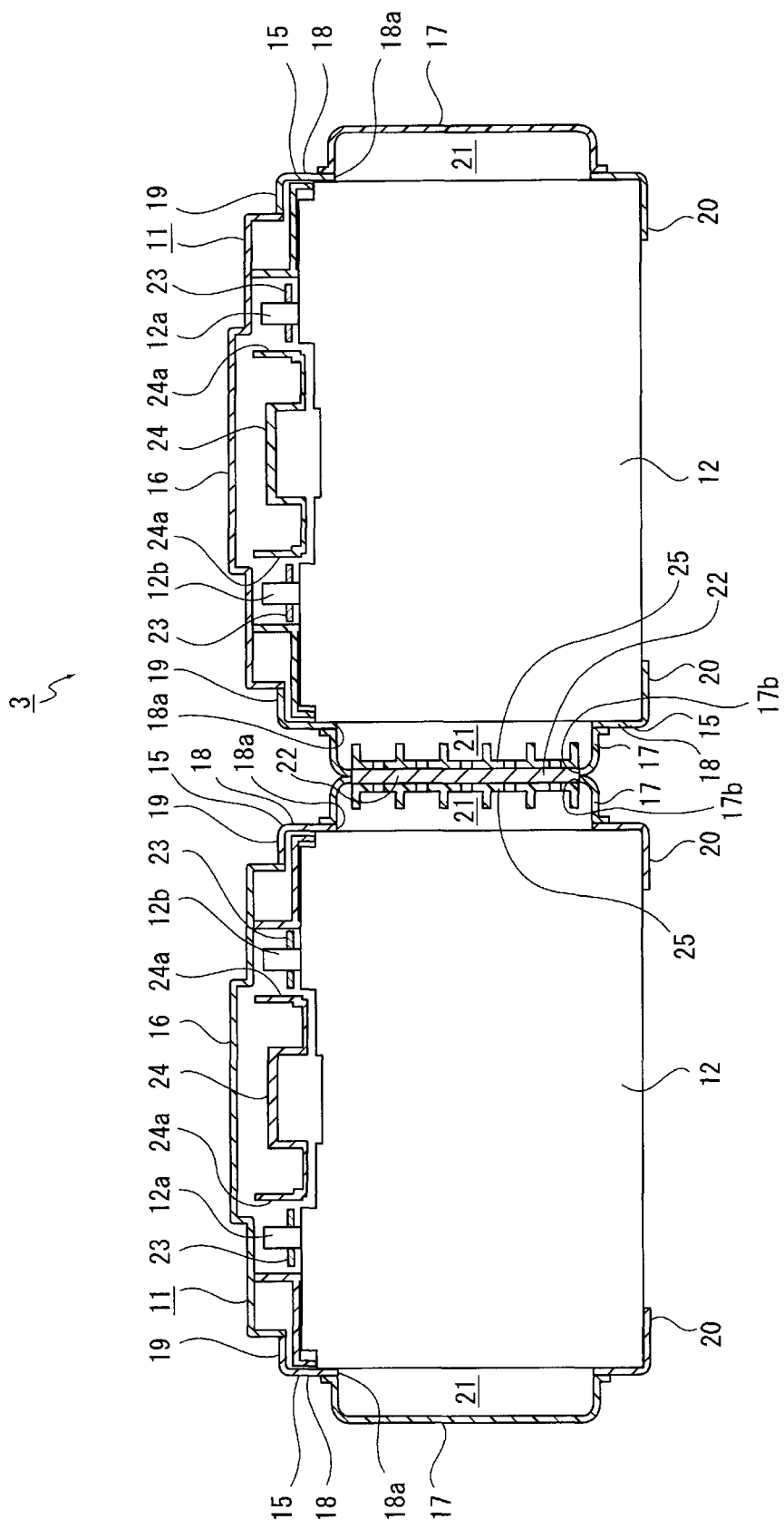
FIG. 10 is a sectional view illustrating an example in which two battery modules are disposed in a contacting state and a common heater is disposed.

In the onboard battery 1, as illustrated in FIG. 10, it may be such that the chamber forming sections 17 are in contact in a state where the battery modules 3 are aligned and disposed, communication holes 17b for communication of the chambers 21 are formed respectively in the chamber forming sections 17, and the heater 22 is disposed at the boundary of the chambers 21.

In this case, the electric heating wires 22b are provided respectively to both surfaces of the heater 22, and the heat sinks 25 are attached respectively to both surfaces of the heater 22. The heat sinks 25 are attached to the heater 22 in a state where the surfaces of the contact sections 27a of the heat conductors 27 are respectively in contact with both surfaces of the heater 22.

By the heater 22 being disposed at the boundary of the chambers 21 and the heat sinks 25 being disposed respectively on both sides of the heater 22 in this manner, one heater 22 is shared by the two battery modules 3. Thus, since the battery cells 12 disposed inside the two battery modules 3 are heated by one heater 22, reduction in the number of components and size can be achieved.

One heater 22 suffices as a source of heat to be released from the two heat sinks 25, and a reduction in the number of components and size of the onboard battery 1 can further be achieved.

Figure 11:
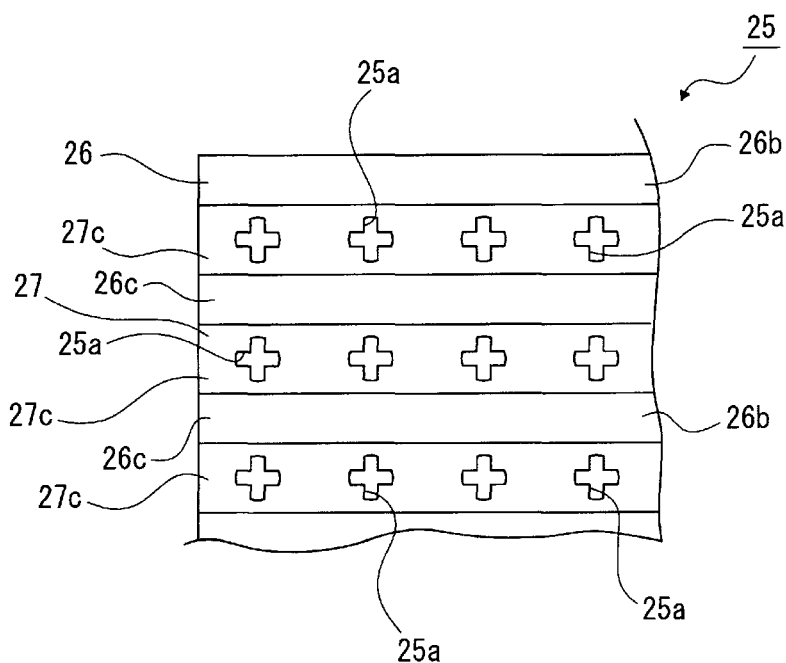
FIG. 11 is a side view illustrating an example in which a heat transferring hole is formed in a cross shape.
Figure 12:
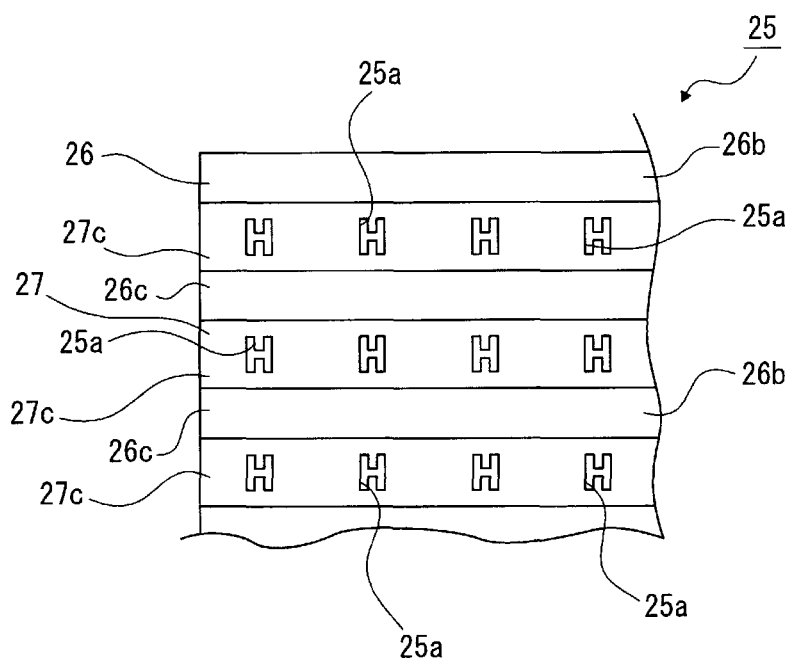
FIG. 12 is a side view illustrating an example in which a heat transferring hole is formed in an H-shape.
Figure 13:
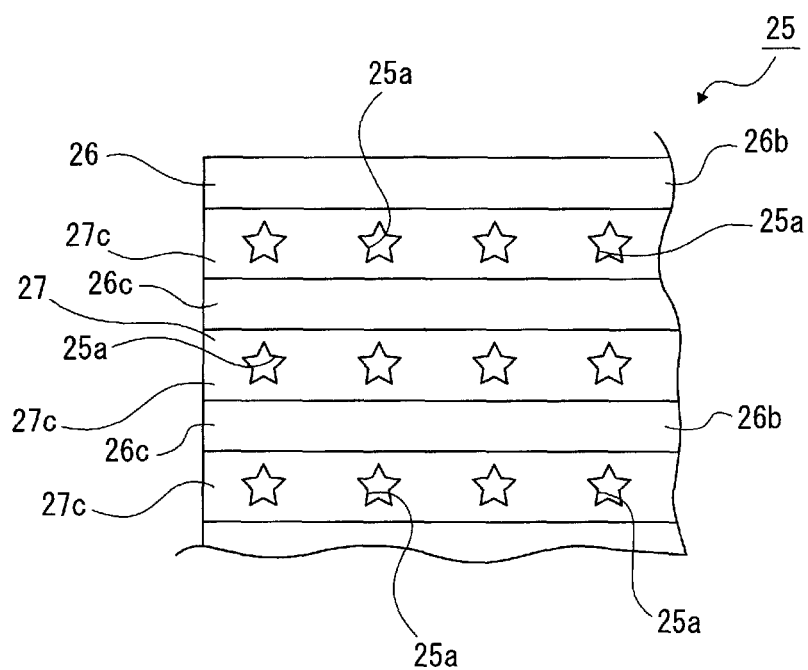
FIG. 13 is a side view illustrating an example in which a heat transferring hole is formed in a star shape.

An example has been illustrated above in which the shape of the heat transferring hole 25a formed in the heat sink 25 is circular. However, the heat transferring hole 25a is not limited to being circular, and any other shape is possible. For example, the heat transferring hole 25a may be formed in a cross shape (see FIG. 11), an H-shape (see FIG. 12), or a star shape (see FIG. 13).

By the heat transferring hole 25a being formed in the cross shape, the H-shape, or the star shape, the heat release area can be further increased to further improve the heating efficiency with respect to the battery cells 12.

An example has been illustrated above in which the shape of the effect hole 25b formed in the heat sink 25 is rectangular. However, the effect hole 25b is not limited to being rectangular, and any other shape is possible to further increase the heat release area.

Further, an example has been illustrated above in which the protrusions 26b of the heat sink 25 are formed in a shape executing in the front-back direction. However, it is possible to form the protrusions 26b in any shape, as long as the shape protrudes sideward from the base plate section 26a.

Figure 14:
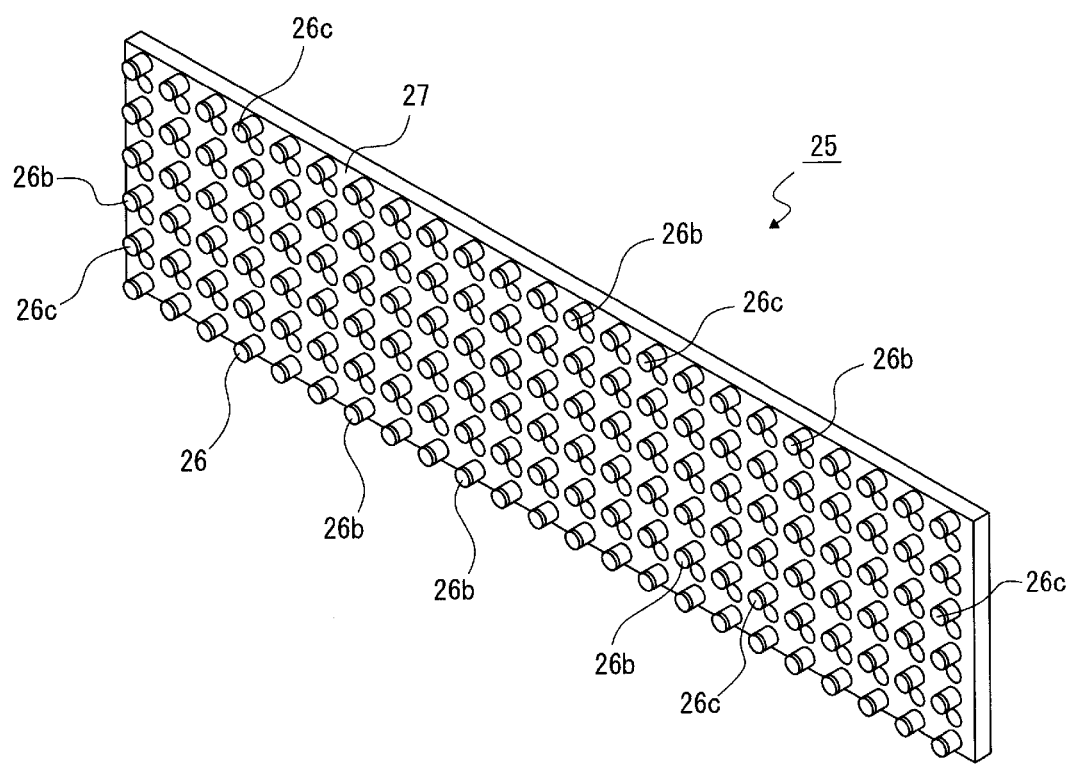
FIG. 14 is a perspective view illustrating an example in which a protrusion is formed in a shaft shape.

The protrusions 26b may be in a shaft shape protruding sideward, as illustrated in FIG. 14, for example. Note that it the protrusions 26b are preferably formed in a shape that does not obstruct the smooth flow of cooling air.

An example has been illustrated above with a configuration of the heat sink 25 in which the heat conductor 27 is provided to the outer surface of the base body 26 formed by a resin material. However, it is possible to form the heat sink 25 by a metal material, for example. Note that, in this case, the end surface 26c of the protrusion 26b is preferably covered by a non-conductive material such as a resin, in order to prevent the occurrence of a short circuit upon contact with the battery cells 12.

The invention claimed is:

1. An onboard battery for a vehicle comprising:
   at least one battery module including battery cells disposed in a predetermined state, and a cell cover in which the battery cells are disposed, at least one part of an internal space of the cell cover being formed as at least one chamber into which cooling air is sent;
   a housing case that houses the battery module;
   at least one intake duct through which the cooling air is sent into the at least one battery module;
   at least one exhaust duct through which the cooling air sent into the at least one battery module is discharged;
   a heater that is disposed in the at least one chamber, and heats the battery cells; and
   a heat sink that is disposed in the at least one chamber, located opposite to the battery cells, and attached to the heater, wherein:
   the heat sink includes a base body formed by a resin material, and a heat conductor provided to an outer surface of the base body and formed by a metal material,
   the base body includes a flat base plate section attached to the heater, and at least one protrusion protruding to the battery cells from the base plate section, and
   the heat conductor is provided to a portion of the at least one protrusion, other than an end surface of the protrusion.

2. The onboard battery for a vehicle according to claim 1, wherein:
the at least one protrusion comprises multiple protrusions, and
each of the multiple protrusions is formed in a shape extending in a direction in which the battery cells are disposed.

3. The onboard battery for a vehicle according to claim 2, wherein the heat sink has heat transferring holes opened to the heater side and the battery cell side, respectively.

4. The onboard battery for a vehicle according to claim 2, further comprising:
at least one cooling fan that causes the cooling air to flow is provided,
wherein driving of the at least one cooling fan is stopped when the heater is driven.

5. The onboard battery for a vehicle according to claim 2, further comprising a heat insulating material that is attached to an outside of the at least one chamber in an outer surface of the at least one battery module.

6. The onboard battery for a vehicle according to claim 2, wherein:
the at least one battery module comprises two battery modules,
the two battery modules are disposed to be adjacent to each other,
the at least one chamber of one of the adjacent battery modules and the at least one chamber of the other battery module communicate with each other,
the heater is disposed at a boundary of the at least one chamber of the one of the battery modules and the at least one chamber of the other battery module, and
the heat sink is disposed on each of two sides of the heater.

7. The onboard battery for a vehicle according to claim 1, wherein the heat sink has heat transferring holes opened to the heater side and the battery cell side, respectively.

8. The onboard battery for a vehicle according to claim 1, further comprising:
at least one cooling fan that causes the cooling air to flow,
wherein driving of the at least one cooling fan is stopped when the heater is driven.

9. The onboard battery for a vehicle according to claim 1, further comprising a heat insulating material that is attached to an outside of the at least one chamber in an outer surface of the at least one battery module.

10. The onboard battery for a vehicle according to claim 1, wherein the at least one battery module comprises two battery modules,
the two battery modules are disposed to be adjacent to each other,
the at least one chamber of one of the adjacent battery modules and the at least one chamber of the other battery module communicate with each other,
the heater is disposed at a boundary of the at least one chamber of the one of the battery modules and the at least one chamber of the other battery module, and
the heat sink is disposed on each of two sides of the heater.

* * * * *